(12) United States Patent
Barry et al.

(10) Patent No.: US 9,632,272 B2
(45) Date of Patent: Apr. 25, 2017

(54) SWITCH RACK SYSTEM

(71) Applicant: Tyco Electronics Corporation, Berwyn, PA (US)

(72) Inventors: Bruce Eltringham Barry, Middletown, PA (US); Michael Jon Kepko, Etters, PA (US); James Joseph Eberle, Jr., Hummelstown, PA (US); Sean Patrick Kelly, York, PA (US); Jeffrey Dean Shipe, Camp Hill, PA (US); Kenneth C. Hall, Lafayett Hill, PA (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 14/692,466

(22) Filed: Apr. 21, 2015

(65) Prior Publication Data
US 2015/0370028 A1    Dec. 24, 2015

Related U.S. Application Data

(63) Continuation of application No. 13/150,786, filed on Jun. 1, 2011, now Pat. No. 9,042,699.

(Continued)

(51) Int. Cl.
*G02B 6/44* (2006.01)
*H02G 3/14* (2006.01)
(Continued)

(52) U.S. Cl.
CPC .......... *G02B 6/4452* (2013.01); *G02B 6/3542* (2013.01); *G02B 6/3817* (2013.01);
(Continued)

(58) Field of Classification Search
CPC .. G02B 6/3897; G02B 6/4452; G02B 6/4472; G02B 6/3542; G02B 6/4471; H01R 25/006; H02G 3/08; H02G 3/14
See application file for complete search history.

(56) References Cited

U.S. PATENT DOCUMENTS 4,510,565 A * 4/1985 Dummermuth .... G05B 19/4147
700/169
4,536,052 A * 8/1985 Baker .................. H04Q 1/06
361/827

(Continued)

FOREIGN PATENT DOCUMENTS

CN         101688960        3/2010
JP       2001-116968 A       4/2001
(Continued)

OTHER PUBLICATIONS

ICC 2-Port Angled Elite Bezel, Item No. IC108BA2XX, DWG No. PS108BA200, 2005.*

(Continued)

*Primary Examiner* — Peter Radkowski
(74) *Attorney, Agent, or Firm* — Merchant & Gould P.C.

(57) ABSTRACT

In one embodiment, the system comprises: (a) a chassis; (b) one or more cards mounted in the chassis, each card having a plurality of switch ports, the plurality of switch ports being aligned in one or more columns; (c) an aggregator mounted adjacent the chassis, the aggregator having a plurality of bays, each bay being aligned with a card in the chassis, at least one of the bays having a faceplate comprising at least first and second aggregator ports aligned in a column; (d) at least first and second hydras, wherein each hydra comprises at least (i) a first connector; (ii) a plurality of second connectors; (iii) a plurality of conductors, each conductor connecting the first connector to one of the second connectors, the plurality of conductors being bundled together to form a trunk portion from the first connector to a breakout point, the plurality of conductors being separated into breakout portions from the breakout point to the second connectors; (iv) wherein the trunk portion of the first cable is longer than that of the second cable; and (e) wherein the first connector of the first hydra is connected to the first aggre- (Continued)

gator port and the second connectors of the first hydra are connected to a first set of switch ports, and the first connector of the second hydra is connected to the second aggregator port and the second connectors of the second hydra are connected to a second set of switch ports, wherein the first set of switch ports are further away from the aggregator than the second set of switch ports.

10 Claims, 9 Drawing Sheets

Related U.S. Application Data

(60) Provisional application No. 61/350,730, filed on Jun. 2, 2010.

(51) Int. Cl.
    H02G 3/08    (2006.01)
    G02B 6/35    (2006.01)
    H01R 25/00    (2006.01)
    H02B 1/34    (2006.01)
    H02B 1/56    (2006.01)
    G02B 6/38    (2006.01)

(52) U.S. Cl.
    CPC ......... *G02B 6/3825* (2013.01); *G02B 6/3831* (2013.01); *G02B 6/4471* (2013.01); *G02B 6/4472* (2013.01); *H01R 25/006* (2013.01); *H02B 1/34* (2013.01); *H02B 1/56* (2013.01); *H02G 3/08* (2013.01); *H02G 3/14* (2013.01); *G02B 6/3897* (2013.01)

(56) References Cited

U.S. PATENT DOCUMENTS

| | | | | |
|---|---|---|---|---|
| 4,824,196 A * | 4/1989 | Bylander | G02B 6/3821 | 385/134 |
| 5,093,885 A * | 3/1992 | Anton | G02B 6/4452 | 385/134 |
| 5,289,558 A * | 2/1994 | Teichler | G02B 6/4452 | 174/50 |
| 5,401,193 A * | 3/1995 | Lo Cicero | H01R 13/518 | 361/823 |
| 5,420,958 A * | 5/1995 | Henson | G02B 6/3806 | 385/135 |
| 5,473,717 A * | 12/1995 | Baptiste | G02B 6/3897 | 385/56 |
| 5,575,668 A * | 11/1996 | Timmerman | A47B 21/06 | 174/482 |
| 5,613,030 A * | 3/1997 | Hoffer | G02B 6/4452 | 385/135 |
| 5,638,481 A * | 6/1997 | Arnett | G02B 6/3817 | 385/135 |
| 5,639,261 A * | 6/1997 | Rutkowski | G02B 6/4452 | 439/31 |
| 5,659,650 A * | 8/1997 | Arnett | G02B 6/3817 | 385/135 |
| 5,664,955 A * | 9/1997 | Arnett | G02B 6/3817 | 174/67 |
| 5,708,742 A * | 1/1998 | Beun | G02B 6/3897 | 385/134 |
| 5,734,776 A * | 3/1998 | Puetz | G02B 6/4442 | 385/134 |
| 5,737,475 A * | 4/1998 | Regester | G02B 6/4454 | 385/134 |
| 5,788,087 A * | 8/1998 | Orlando | H04Q 1/13 | 211/26 |
| 5,969,294 A * | 10/1999 | Eberle | G02B 6/3825 | 174/57 |
| 5,984,720 A * | 11/1999 | Milner | G02B 6/3897 | 439/534 |
| 6,024,610 A * | 2/2000 | Schaffer | G02B 6/4452 | 439/719 |
| 6,195,493 B1 | 2/2001 | Bridges | | |
| 6,208,796 B1 * | 3/2001 | Williams Vigliaturo | G02B 6/4453 | 324/66 |
| 6,250,816 B1 * | 6/2001 | Johnston | G02B 6/3897 | 385/135 |
| 6,278,829 B1 | 8/2001 | BuAbbud et al. | | |
| 6,293,707 B1 * | 9/2001 | Wild | G02B 6/3897 | 385/55 |
| 6,524,134 B2 | 2/2003 | Flickinger et al. | | |
| 6,535,682 B1 * | 3/2003 | Puetz | G02B 6/4452 | 385/135 |
| 6,537,106 B1 * | 3/2003 | Follingstad | H01R 13/518 | 439/534 |
| 6,565,260 B2 * | 5/2003 | Belaidi | G02B 6/4466 | 385/135 |
| 6,579,014 B2 | 6/2003 | Melton et al. | | |
| 6,584,267 B1 * | 6/2003 | Caveney | G02B 6/4452 | 385/134 |
| 6,631,237 B2 * | 10/2003 | Knudsen | G02B 6/4452 | 174/50 |
| 6,668,127 B1 | 12/2003 | Mahony | | |
| 6,761,585 B2 * | 7/2004 | Clark | H01R 13/518 | 439/540.1 |
| 6,766,095 B1 * | 7/2004 | Bjorklund | G02B 6/4452 | 385/135 |
| 6,824,312 B2 * | 11/2004 | McClellan | H05K 7/1448 | 385/53 |
| 6,850,685 B2 * | 2/2005 | Tinucci | G02B 6/4455 | 385/134 |
| 6,866,541 B2 * | 3/2005 | Barker | G02B 6/4452 | 439/540.1 |
| 6,881,076 B2 * | 4/2005 | Baker | H04Q 1/146 | 333/260 |
| 6,916,199 B2 * | 7/2005 | Follingstad | H01R 13/518 | 385/75 |
| 6,955,479 B2 | 10/2005 | Erdman et al. | | |
| 6,974,348 B2 * | 12/2005 | Bentley | H04Q 1/13 | 439/540.1 |
| 6,980,725 B1 | 12/2005 | Swieconek | | |
| 6,981,893 B2 * | 1/2006 | Barker | G02B 6/4452 | 439/540.1 |
| 6,983,095 B2 * | 1/2006 | Reagan | G02B 6/4452 | 385/135 |
| 7,070,459 B2 * | 7/2006 | Denovich | H04Q 1/13 | 385/134 |
| 7,088,899 B2 * | 8/2006 | Reagan | G02B 6/4452 | 385/135 |
| 7,094,095 B1 * | 8/2006 | Caveney | G02B 6/3897 | 385/134 |
| 7,103,255 B2 * | 9/2006 | Reagan | G02B 6/4452 | 385/135 |
| 7,118,286 B2 | 10/2006 | Gurreri et al. | | |
| 7,146,089 B2 * | 12/2006 | Reagan | G02B 6/4452 | 385/135 |
| 7,171,102 B2 * | 1/2007 | Reagan | G02B 6/4452 | 385/135 |
| 7,182,523 B2 | 2/2007 | Abendschein et al. | | |
| 7,200,317 B2 * | 4/2007 | Reagan | G02B 6/4452 | 385/134 |
| 7,207,835 B2 * | 4/2007 | Levesque | H04Q 1/066 | 439/540.1 |
| 7,220,145 B2 * | 5/2007 | Denovich | G02B 6/4452 | 439/540.1 |
| 7,233,731 B2 * | 6/2007 | Solheid | G02B 6/3849 | 385/135 |
| 7,241,182 B2 * | 7/2007 | Clark | H01R 13/518 | 439/676 |
| 7,244,144 B2 * | 7/2007 | Follingstad | H01R 13/518 | 439/534 |
| 7,300,308 B2 * | 11/2007 | Laursen | G02B 6/3897 | 439/540.1 |
| 7,302,153 B2 * | 11/2007 | Thom | G02B 6/4452 | 385/134 |

(56) References Cited

U.S. PATENT DOCUMENTS

| | | | | |
|---|---|---|---|---|
| 7,306,468 B2* | 12/2007 | Baker | H04Q 1/146 | 439/620.08 |
| 7,325,976 B2 | 2/2008 | Gurreri et al. | | |
| 7,335,056 B1* | 2/2008 | Clark | H01R 13/518 | 439/534 |
| 7,357,667 B2* | 4/2008 | Clark | H04Q 1/136 | 439/540.1 |
| 7,393,243 B2* | 7/2008 | Caveney | H01R 25/16 | 439/540.1 |
| 7,444,056 B2* | 10/2008 | Allen | G02B 6/3878 | 385/135 |
| 7,455,548 B2* | 11/2008 | Clark | H01R 13/518 | 439/247 |
| 7,457,503 B2* | 11/2008 | Solheid | G02B 6/3849 | 385/135 |
| 7,488,205 B2* | 2/2009 | Spisany | H04Q 1/13 | 385/135 |
| 7,563,102 B2 | 7/2009 | Nordin et al. | | |
| 7,623,749 B2* | 11/2009 | Reagan | G02B 6/4452 | 385/135 |
| 7,651,277 B2 | 1/2010 | Gurreri et al. | | |
| 7,668,430 B2* | 2/2010 | McClellan | H05K 7/1448 | 385/134 |
| 7,697,811 B2* | 4/2010 | Murano | G02B 6/4452 | 385/134 |
| 7,762,839 B2* | 7/2010 | Chen | H01R 4/2416 | 439/540.1 |
| 7,821,792 B2* | 10/2010 | Belady | H05K 1/14 | 361/679.01 |
| 7,844,159 B2* | 11/2010 | Solheid | G02B 6/3849 | 385/135 |
| 7,874,869 B2* | 1/2011 | Chern | H01R 13/518 | 439/540.1 |
| 9,042,699 B2 | 5/2015 | Barry et al. | | |
| 2001/0001270 A1* | 5/2001 | Williams Vigliaturo | G02B 6/4453 | 385/135 |
| 2002/0125800 A1* | 9/2002 | Knudsen | G02B 6/4452 | 312/223.6 |
| 2002/0181896 A1* | 12/2002 | McClellan | H05K 7/1448 | 385/88 |
| 2003/0129871 A1* | 7/2003 | Follingstad | H01R 13/518 | 439/534 |
| 2003/0185535 A1* | 10/2003 | Tinucci | G02B 6/4455 | 385/134 |
| 2004/0209515 A1* | 10/2004 | Caveney | H01R 13/518 | 439/540.1 |
| 2005/0002633 A1* | 1/2005 | Solheid | G02B 6/3849 | 385/135 |
| 2005/0105873 A1* | 5/2005 | Reagan | G02B 6/4452 | 385/135 |
| 2005/0129379 A1* | 6/2005 | Reagan | G02B 6/4452 | 385/135 |
| 2005/0135770 A1* | 6/2005 | McClellan | H05K 7/1448 | 385/135 |
| 2005/0146828 A1* | 7/2005 | Baker | H04Q 1/146 | 361/119 |
| 2005/0191010 A1* | 9/2005 | Gurreri | G02B 6/3831 | 385/58 |
| 2005/0207134 A1* | 9/2005 | Belady | H05K 1/14 | 361/796 |
| 2006/0008231 A1* | 1/2006 | Reagan | G02B 6/3849 | 385/135 |
| 2006/0029334 A1 | 2/2006 | Quinby et al. | | |
| 2006/0063436 A1 | 3/2006 | Gurreri et al. | | |
| 2006/0269208 A1* | 11/2006 | Allen | G02B 6/4471 | 385/135 |
| 2007/0025674 A1* | 2/2007 | Kowalczyk | G02B 6/3849 | 385/134 |
| 2007/0104449 A1* | 5/2007 | Thom | G02B 6/4452 | 385/136 |
| 2007/0165995 A1* | 7/2007 | Reagan | G02B 6/4452 | 385/135 |
| 2007/0184712 A1* | 8/2007 | Martich | H01R 13/74 | 439/540.1 |
| 2007/0189693 A1* | 8/2007 | Smrha | G02B 6/4452 | 385/135 |
| 2008/0008436 A1* | 1/2008 | Reagan | G02B 6/3849 | 385/135 |
| 2008/0008437 A1* | 1/2008 | Reagan | G02B 6/3849 | 385/135 |
| 2008/0013910 A1* | 1/2008 | Reagan | G02B 6/3849 | 385/135 |
| 2008/0025683 A1 | 1/2008 | Murano | | |
| 2008/0055847 A1* | 3/2008 | Belady | H05K 1/14 | 361/679.49 |
| 2008/0075411 A1* | 3/2008 | Solheid | G02B 6/3849 | 385/135 |
| 2008/0090433 A1 | 4/2008 | Murano et al. | | |
| 2008/0096438 A1* | 4/2008 | Clark | H01R 13/518 | 439/713 |
| 2008/0115956 A1* | 5/2008 | Fransen | H05K 7/186 | 174/66 |
| 2008/0146079 A1* | 6/2008 | Spisany | H04Q 1/13 | 439/540.1 |
| 2008/0152292 A1 | 6/2008 | Wilken et al. | | |
| 2008/0175551 A1* | 7/2008 | Smrha | G02B 6/4452 | 385/135 |
| 2008/0176445 A1* | 7/2008 | Shifris | H01R 9/2416 | 439/540.1 |
| 2009/0016043 A1* | 1/2009 | Hruby | G02B 6/4452 | 361/827 |
| 2009/0074372 A1* | 3/2009 | Solheid | G02B 6/3849 | 385/135 |
| 2009/0163043 A1* | 6/2009 | Demers | G02B 6/4452 | 439/43 |
| 2009/0196563 A1 | 8/2009 | Mullsteff et al. | | |
| 2009/0317045 A1* | 12/2009 | Reagan | G02B 6/4452 | 385/135 |
| 2010/0061691 A1* | 3/2010 | Murano | G02B 6/4452 | 385/135 |
| 2010/0129040 A1 | 5/2010 | Zamzow et al. | | |
| 2010/0158465 A1 | 6/2010 | Smrha | | |
| 2010/0159742 A1* | 6/2010 | Chen | H01R 4/2416 | 439/540.1 |
| 2010/0279519 A1* | 11/2010 | Mei | H01R 31/005 | 439/55 |
| 2011/0007470 A1* | 1/2011 | Belady | H05K 1/14 | 361/679.31 |

FOREIGN PATENT DOCUMENTS

| | | |
|---|---|---|
| JP | 3176906 | 6/2001 |
| JP | 3836378 | 10/2006 |
| JP | 3983558 | 9/2007 |
| WO | WO 2006/113810 A2 | 10/2006 |

OTHER PUBLICATIONS

Annex to Form PCT/ISA/206 Partial Search Report, International Application No. PCT/US2011/001002, International Filing Date Feb. 6, 2011.

Search Report and Chinese Office Action dated May 28, 2014; CN Patent Appln. No. 201180037998.7; 10 pgs.

* cited by examiner

SWITCH RACK SYSTEM

CROSS REFERENCE TO RELATED APPLICATION

This continuation application claims priority to U.S. patent application Ser. No. 13/150,786, filed Jun. 1, 2011, now U.S. Pat. No. 9,042,699, issued May 25, 2015, which claims priority to U.S. Provisional Application No. 61/350,730, filed Jun. 2, 2010, hereby incorporated by reference in its entirety.

This application is also related to U.S. patent application Ser. No. 13/150,814, filed Jun. 1, 2011.

FIELD OF INVENTION

The present invention relates generally to organizing switch rack systems and, more specifically, to a switch rack system for managing hydras to reduce clutter and improve the ease and reliability of the hydra installation.

BACKGROUND

Although network architectures may vary, common to most networks, and of particular interest herein, are switch rack systems. Such systems involve multiple-port cards mounted in a chassis. Each activated port of a card is connected to an aggregation box in the panel with patch cord. The aggregation box, in turn, is connected to a deaggregation or breakout box with a trunk. The breakout box breaks out the trunk into individual channels again. The interconnections between the ports and the aggregation box and between the aggregation and breakout boxes may be accomplished using optical fiber or electrical conductor. Optical fibers and electric conductors are collectively referred to herein as "conductors".

One of the objectives in designing switch rack systems is to minimize floor space. To this end, efforts are generally concentrated on increasing port density. This means increasing the number of ports on a particular switch and increasing the number of cards that fit into a particular rack or panel. A challenge in designing and installing such high port density switch racks is organizing the patch cords interconnecting the ports to the aggregator. For example, each activated port requires a discrete connection to the aggregator. This can lead to a great quantity of patch cords and general clutter as is known in the art.

Applicants recognize that much of the jumble/clutter associated with switch racks is caused by excess cable connecting the switches to the aggregator. To some extent, this clutter has been reduced by the advent of "hydras," which essentially bundle the ends of multiple patch cords and terminate the bundle with a single multi-conductor connector. However, hydras also tend to have excess cable. More specifically, hydras are pre-terminated on each end with connectors to facilitate connection in the field. Because the conductors are pre-terminated, they must be a predetermined length. However, at the time the hydras are fabricated/terminated with connectors, the required length is typically unknown. That is, depending upon the port's location in the panel and the corresponding location of its respective connection in the aggregator, the required lengths of the hydras can vary. Since this length is not known at the time the hydras are prepared, most hydras are manufactured to accommodate the longest distances typically required. Although this approach ensures that all switch ports can be connected to their respective connection in the aggregator, it necessarily means that there is excess cable length for most of the interconnections.

Aside from being unsightly, this clutter may cause other problems as well. First, the unwieldy interconnections create a strong likelihood that a hydra will be connected to the wrong port in error. In other words, even trained technicians find it difficult to work around such clutter effectively without making errors. If a hydra is in fact connected to the wrong port, it may take hours to troubleshoot and resolve the problem in the mass of interconnections.

Another problem caused by this clutter is that complicates the task of activating an inactivated port difficult. More specifically, if a port is not required at the time of installation, it will often not be populated with a transceiver or other active device typically found in such ports. If, however, demand increases, the capacity of the switch rack may be increased by activating one or more ports. This typically requires populating the inactivated ports with a transceiver or other active device retroactively, and thus interconnecting the port with the aggregator retroactively. Such a retroactive installation of a hydra in a cluttered environment is difficult, and, as mentioned above, prone to error.

Although cable ties and other measures may be taken to organize these hydras, these approaches are aimed at bundling the excess cable, but not eliminating it. Therefore, a need exists for a switch rack system that minimizes clutter and thereby reduces the likelihood of improper interconnections and increases the ability to retroactively activate and interconnect ports on the card. The present invention fulfills these needs among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention is directed to a system for organizing switch racks. One aspect of the invention is a family of hydras having varying length to essentially "semi-customize" a hydra for a particular interconnection. As used herein, the term "hydra" broadly refers to a terminated group of conductors in which a single multi-conductor connector terminates one end of the conductors and multiple single or multi-conductor connectors terminate the other end of the conductors. Applicants understand that, while it may be impractical to manufacture a hydra for each specific interconnect between a switch port and an aggregator port, hydras can be organized such that the conductors are bundled together to connect to the aggregator and breakout at some point—i.e., a breakout point—to connect to individual switch ports. Furthermore, Applicants recognize the overall length of a particular hydra may be varied along with the lengths of the breakout portions to better approximate the typical lengths required. Although this approach may be problematic if the technician installs the wrong semi-customized hydra between the aggregator ports and various switch ports, to minimize the chance of this error, the hydra of the present invention comprises at least one secure connector such that the chance of a cable being connected to wrong aggregator port is minimized.

In one embodiment, the breakout hydra comprises (a) a first connector, the first connector being a secure, multi-conductor connector; (b) a plurality of second connectors; (c) a plurality of conductors, each conductor connecting the first connector to one of the second connectors; wherein the plurality of conductors are bundled together to form a trunk from the first connector to a breakout point; wherein the plurality of conductors are separated into breakout portions from the breakout point to the second connectors.

Another aspect of the invention a family of hydras having semi-customized lengths. In one embodiment, the family comprises a plurality of hydras, wherein each hydra comprises (a) a first connector, the first connector being a secure, multi-conductor connector; (b) a plurality of second connectors; (c) a plurality of conductors, each conductor connecting the first connector to one of the second connectors, the plurality of conductors being bundled together to form a trunk portion from the first connector to a breakout point, the plurality of conductors being separated into breakout portions from the breakout point to the second connectors; wherein each hydra has an overall length from its respective first connector to the second connector on a breakout portion having the longest length, the overall length being different among the plurality of hydras; and (d) wherein the first connector of each hydra is a different secure connector.

Yet another aspect of the invention is a system that synergistically combines the hydra and aggregator described above to provide an organized, high-integrity, and easily installed switch rack system. In one embodiment, the system comprises: (a) a chassis; (b) one or more cards mounted in the chassis, each card having a plurality of switch ports, the plurality of switch ports being aligned in one or more columns; (c) an aggregator mounted adjacent the chassis, the aggregator having a plurality of bays, each bay corresponding to a card in the chassis, at least one of the bays having a faceplate comprising at least first and second aggregator ports aligned in a column; (d) at least first and second hydras, wherein each hydra comprises at least (i) a first connector; (ii) a plurality of second connectors; (iii) a plurality of conductors, each conductor connecting the first connector to one of the second connectors, the plurality of conductors being bundled together to form a trunk portion from the first connector to a breakout point, the plurality of conductors being separated into breakout portions from the breakout point to the second connectors; (iv) wherein the trunk portion of the first cable is longer than that of the second cable; and (e) wherein the first connector of the first hydra is connected to the first aggregator port and the second connectors of the first hydra are connected to a first set of switch ports, and the first connector of the second hydra is connected to the second aggregator port and the second connectors of the second hydra are connected to a second set of switch ports, wherein the first set of switch ports are further away from the aggregator than the second set of switch ports.

DETAILED DESCRIPTION

Figure 1:
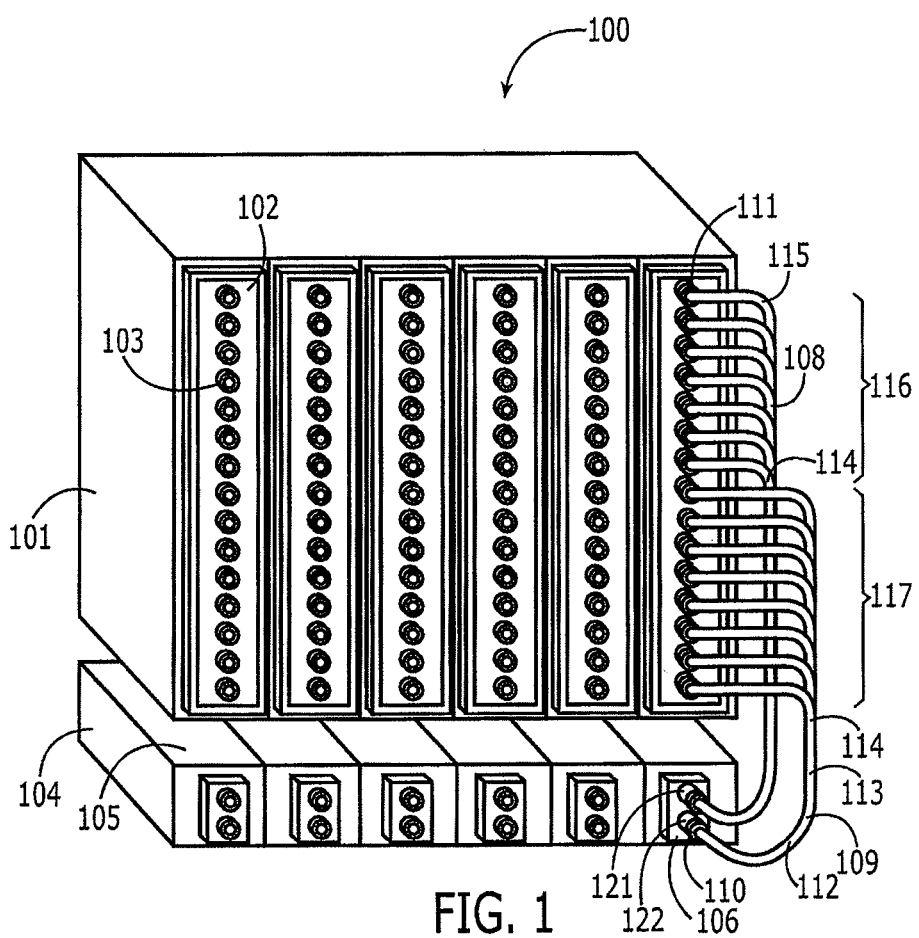
FIG. 1 shows an embodiment of the switch rack system of the present invention.

Referring to FIG. 1, a switch rack system 100 of the present invention is shown. As shown, the switch rack system 100 comprising a standard rack to which a chassis 101 is mounted and one or more cards 102 are mounted in the chassis. Each card 102 has a plurality of switch ports 103 aligned in one or more columns. The switch rack system also comprises an aggregator 104 mounted adjacent the chassis. The aggregator 104 has a plurality of bays 105 with each bay corresponding to a card 102 in the chassis 101. At least one of the bays has a faceplate 106 comprising at least first and second aggregator ports 121, 122 aligned in a column. In one embodiment, the column of switch ports and the column of aggregator ports are aligned. It should be understood that the term "aligned" as used in this context does not require an exact alignment, but only rough alignment such that a hydra extending between a given card and the aligned aggregator port is not forced to cross over an adjacent card.

Figure 13:
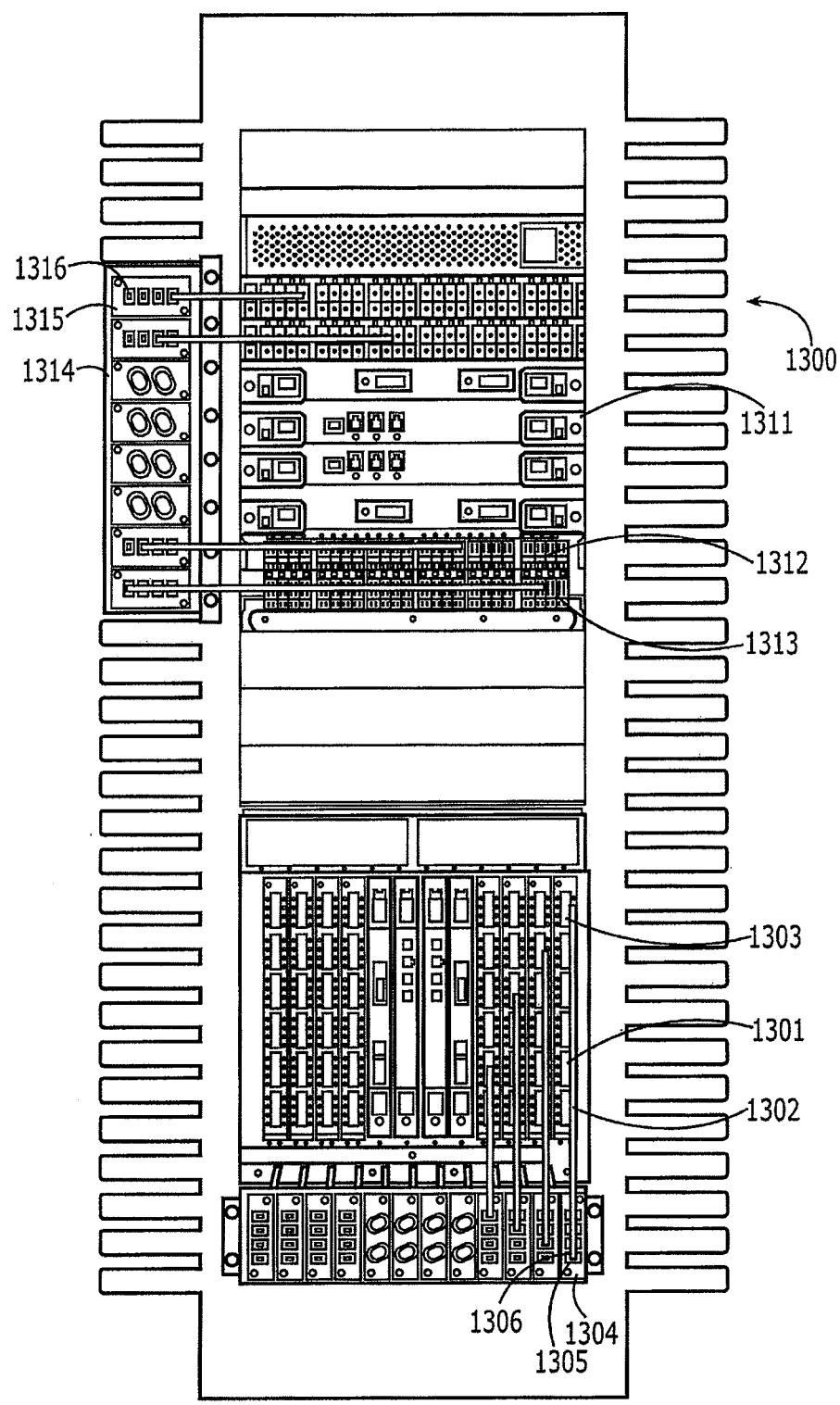
FIG. 13 shows the different vertically and horizontally aligned embodiments of the aggregator.

In embodiment shown in FIG. 1, the aggregator is configured to mount above or below the chassis, and, in the particular embodiment shown in FIG. 1, it is mounted below the chassis. However, other embodiments are possible. For example, referring to FIG. 13, alternative embodiments of the switch rack system 1300 of the present invention are shown in which the aggregator is aligned vertically and horizontally with the cards in the chassis. Specifically, at the bottom of the rack, an embodiment similar to that of FIG. 1 is shown in which the aggregator 1304 is below the card chassis 1301. Toward the top of the rack, a different embodiment is shown which the aggregator 1314 is configured to mount to the side of the chassis 1311. The choice of which aggregator configuration to use depends generally, but not necessarily, on the card configuration. For example, in the lower embodiment, the cards 1302 have a vertical configuration in which they are held vertically in the chassis 1301, side-by-side, such that the switch ports 1303 of the different cards form vertical columns. In the upper embodiment, the cards 1312 have a horizontal configuration in which they are essentially stacked in the chassis 1311 such that the switch ports 1313 of the different cards form horizontal columns. If the switch ports are aligned along a vertical column, then the aggregator 1304 that mounts above/below the chassis 1301 is preferred such that its bays 1305 correspond with the cards 1302 and the switch ports 1303 and aggregator ports 1306 align vertically. Likewise, if the switch ports 1313 are arranged in a horizontal column, then mounting the aggregator 1314 on the side of the chassis 1311 is preferred such that its bays 1315 correspond with the cards 1312 and the switch ports 1313 and aggregator ports 1316 align horizontally.

The cards and the aggregator are interconnected with a plurality of hydras. The term "hydra" broadly refers to a terminated group of conductors in which a single multi-conductor connector (i.e. the first connector) terminates one end of the conductors and a plurality of single or multi-conductor connectors (i.e., second connectors) terminate the other end of the conductors. For illustrative purposes, just two hydras, first and second hydras 108, 109 are shown. Each hydra comprises a first multi-conductor connector 110 and a plurality of second connectors 111 connected by a plurality of conductors 112. Each conductor 112 connects the first connector 110 to one of the second connectors 111. The plurality of conductors are bundled together to form a trunk portion 113 from the first connector 110 to a breakout point 114. As used herein, the term "bundle" or "bundling" refers generally to taking individual cables and capturing them or holding them together. Suitable means for bundling fibers include a skip binding, a cord or even tie-wraps. In one embodiment, the conductors are bundled in a single or multiple jackets.

The plurality of conductors are separated into breakout portions 115 from the breakout point 114 to the second connectors 111. Each hydra has an overall length from its respective first connector 110 to a second connector 111 on a breakout portion having the longest length. The overall length of the first hydra is greater than that of the second hydra.

With respect to the interconnections of cards and aggregator, the first connector 110 of the first hydra 108 is connected to the first aggregator port 121 and the second connectors 111 of the first hydra 108 are connected to a first set 116 of the switch ports 103. Likewise, the first connector 110 of the second hydra 109 is connected to the second aggregator port 122 and the second connectors of the second hydra are connected to a second set 117 of the switch ports 103. The first set 116 of switch ports is further away from the aggregator than the second set 117 of switch ports. Each of these elements is described in greater detail below.

Figure 2:
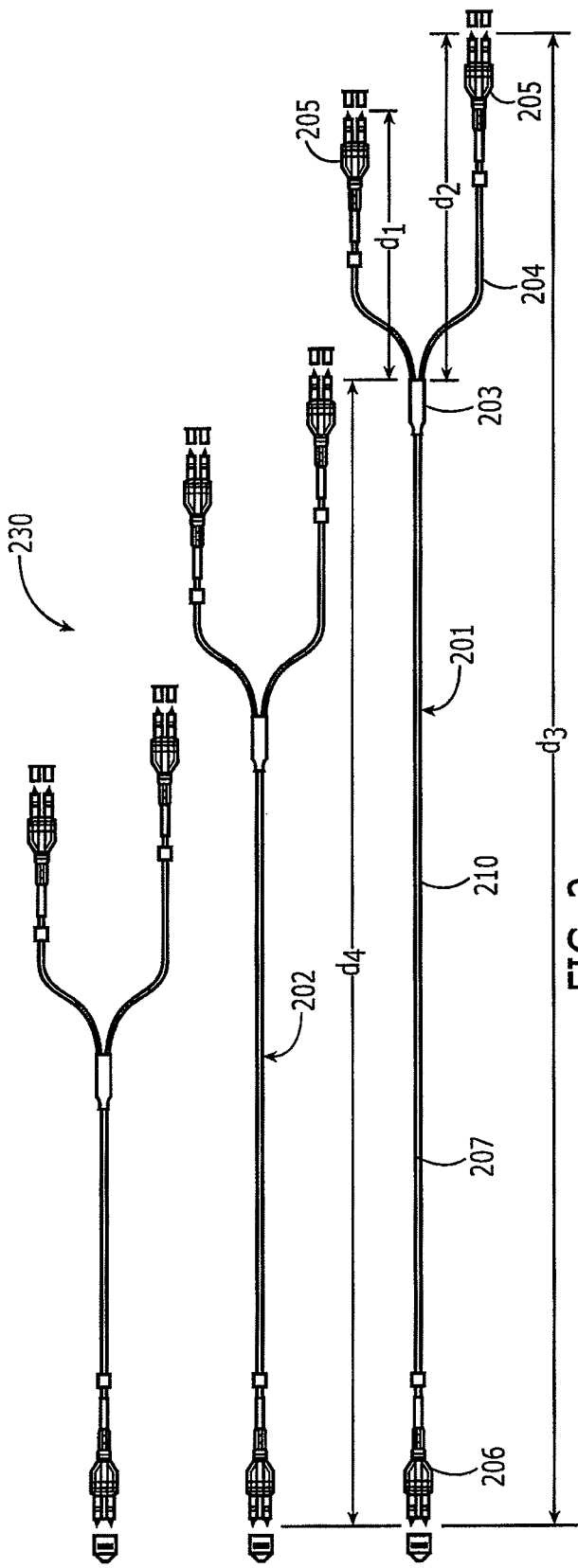
FIG. 2 shows a family of hydras of the present invention illustrating the variable length among different hydras.

Referring to FIG. 2, one of the components of the rack system of the present invention is shown. Specifically, FIG. 2 shows a family 230 of hydras comprising (a) a first connector 206, the first connector being a secure, multi-conductor connector; (b) a plurality of second connectors 205; (c) a plurality of conductors 210, each conductor connecting the first connector 206 to one of the second connectors 205, the plurality of conductors 210 being bundled together to form a trunk portion 207 from the first connector to a breakout point 203, the plurality of conductors being separated into breakout portions 204 from the breakout point 203 to the second connectors 205. In one embodiment, the lengths $d_1$, $d_2$ of two or more breakout portions 204 of a given hydra 201 differ. In the same or different embodiment, the overall length of a hydra differs from one hydra 201 to another 202. For example, referring back to FIG. 2, in which a family of hydras is shown, the overall length $d_3$ of hydra 201 differs from the overall length $d_4$ from the hydra 202. The overall length is defined as the longest distance from the first conductor to the second conductor. (The length between the first conductor and the second conductor will vary if the length of the breakout portions vary.) Accordingly, by having a family of hydras of varying length, the present invention provides semi-customized hydras to connect ports to the aggregator.

To ensure that a "semi-customized" hydra is used in its appropriate spot in the switch rack, secure connectors are used. A secure connector is a well known connector sold by TE Connectivity (Harrisburg, Pa.), and is described for example in U.S. Pat. Nos. 7,651,277, 7,325,976 7,182,523, 7,118,286, and 6,955,479, hereby incorporated by reference. Essentially, a secure connector has one or more physical features or keys that allow it to be plugged only into a particular adaptor or mating connector for which it is geometrically matched. (As used herein, the term "adaptor" refers broadly to any receptacle configured to receive a plug.) Thus, if the first connector 206 is a secure connector, it can only be received in a secure adaptor configured to cooperate with the unique keying mechanism. This is described in greater detail with respect to the aggregator 501 described with respect to FIG. 5 et seq. The first connectors can be any known multi-conductor connector having secure features for electrical and optical applications. Such connectors include, for example, optical connectors for MT ferrules or other multiport connectors. More specifically, the first connector may be an MPO or MPX type connector. Such connectors are well known in the art and secured versions are disclosed for example in U.S. Pat. No. 7,182, 523.

The second connectors can be any known simplex, duplex, or multi-conductor connectors including electrical and optical connectors. For example, they may be RJ-type connectors in the electronic field, or LC, SC or MT-type connectors in the optical field. In one embodiment, the second connectors are also secure connectors to ensure that they are only plugged into the appropriate port. (Again, secure connectors for simplex and duplex connectors are known and described for example in U.S. Pat. Nos. 7,651, 277, 7,325,976 and 6,955,479.) As shown in FIG. 2, the second connectors 205 are duplex LC connectors.

As mentioned above, by having hydras of varying length and varying breakout lengths, the amount of excess fiber between the port and the cable panel can be significantly reduced. Furthermore, by bundling the individual conductors after the breakout point into a single trunk, clutter is greatly reduced. Finally, by having the secure adaptor at least on the first connector side, error in connecting the semi-customized hydras of the present invention is significantly reduced. This is particularly true if the technician installs the hydras starting with the hydra that has the overall longest length.

Another aspect of the invention is providing a connection for each port regardless of whether the port is activated or not. By way of background, activating a port can be a relatively expensive proposition in the sense that it needs to be populated with a transceiver. Thus, if the port is not needed, a transceiver typically will not be installed in the port. Applicants recognize, however, that just because the port does not contain a transceiver that does not prevent a hydra being assigned to that port initially, rather than retroactively when and if the port is populated. To this end, connectors assigned to inactivated ports in the present invention may contain a plug that is configured to interengage a port. This way, the hydras can be installed initially in each and every port regardless of whether the port has a transceiver. If and when the port is activated with a transceiver, the plug can be removed and the connector inserted directly into the transceiver. This approach not only avoids the need to interconnect a port with an aggregator retroactively, which can be difficult and error prone as discussed above, but also serves to further increase the order of the semi-customized hydras used in the switch rack. In other words, there are no hydras hanging free and loose.

Figure 4:
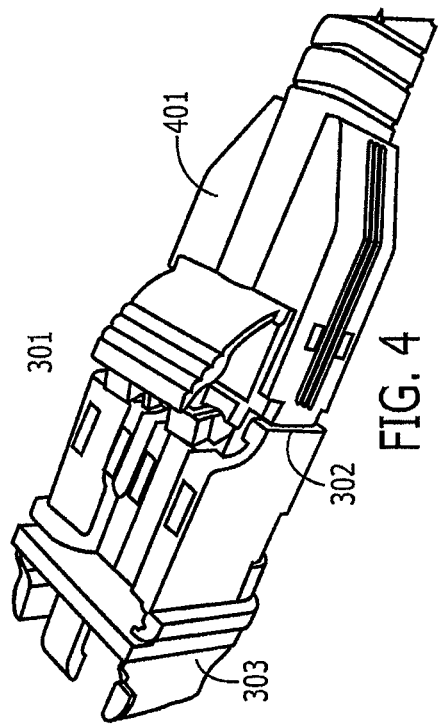
FIG. 4 shows the inactivated port adapter of FIG. 3 connected to a duplex connector of the hydra of the present invention.
Figure 3:
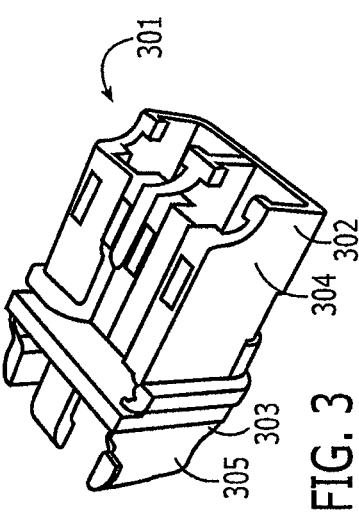
FIG. 3 shows an inactivated port adapter.

To facilitate connecting two ports to inactivated ports, a plug 301 is disclosed as shown in FIG. 3. Plug 301 comprises a body portion 304 having a first end 302 and a second end 303. The first end 302 is configured to meet with a connector. To this end, it resembles the geometry used in ordinary adaptors, which are configured to mate with connectors. For example, it may resemble an LC adaptor, both a simplex or duplex adaptor, an SC simplex or duplex adaptor, or an MTRJ adaptor. Such adaptors are well known, and includes, for example, LC, SC and MTRJ adaptor. FIG. 4 shows the plug of FIG. 3 connected to an LC duplex connector 401.

The second end 303 is configured to snap into a port. To this end, it comprises resilient tabs 305, which are well known in the art for facilitating the connection to a port. By way of background, an inactivated port typically comprises a receptacle for receiving a pluggable transceiver. Accordingly, in one embodiment, the second end 303 is configured to be received in a pluggable transceiver receptacle such as those disclosed in U.S. Pat. No. 6,524,134, herein incorporated by reference. Thus, plug 301 serves to connect to the transceiver cage at the second end 305 and thus secure the hydra to that port even if there is no transceiver in the cage. Additionally, in one embodiment, the plug 302 is sufficiently long such that a hydra using this plug will be distinct from those which are indeed plugged into a transceiver, thus making the retroactive activation of the port a simple task of merely removing the distinct plug and inserting a transceiver into the cage, removing the plug, and inserting the second connector of the hydra into the now activated port/transceiver. In other words, in this embodiment, when the second connector of a hydra is connected to the plug 302, the second connector will protrude further than a second connector connected to an activated switch port. This additional protrusion allows the user to identify easily inactivated switch ports.

Figure 5:
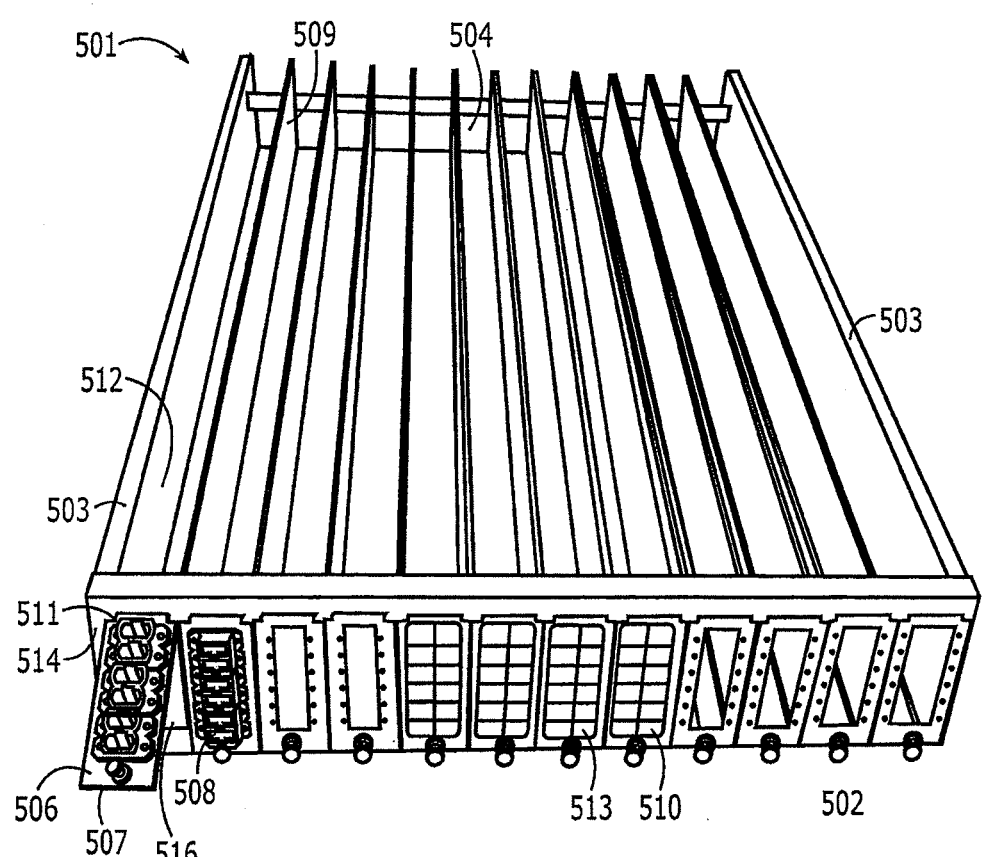
FIG. 5 shows an aggregator of the present invention with secured ports for interconnection to the hydra of the present invention.
Figure 6:
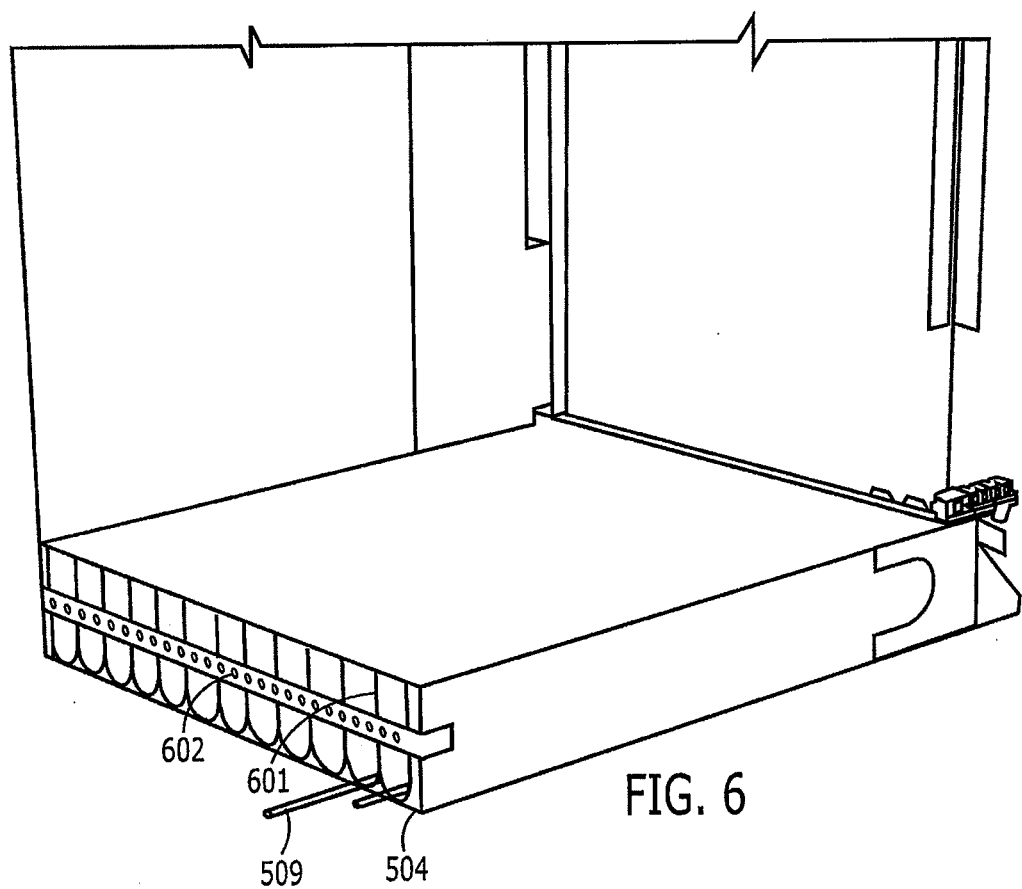
FIG. 6 shows a schematic of the aggregator of FIG. 5 from a rear prospective.
Figure 7:
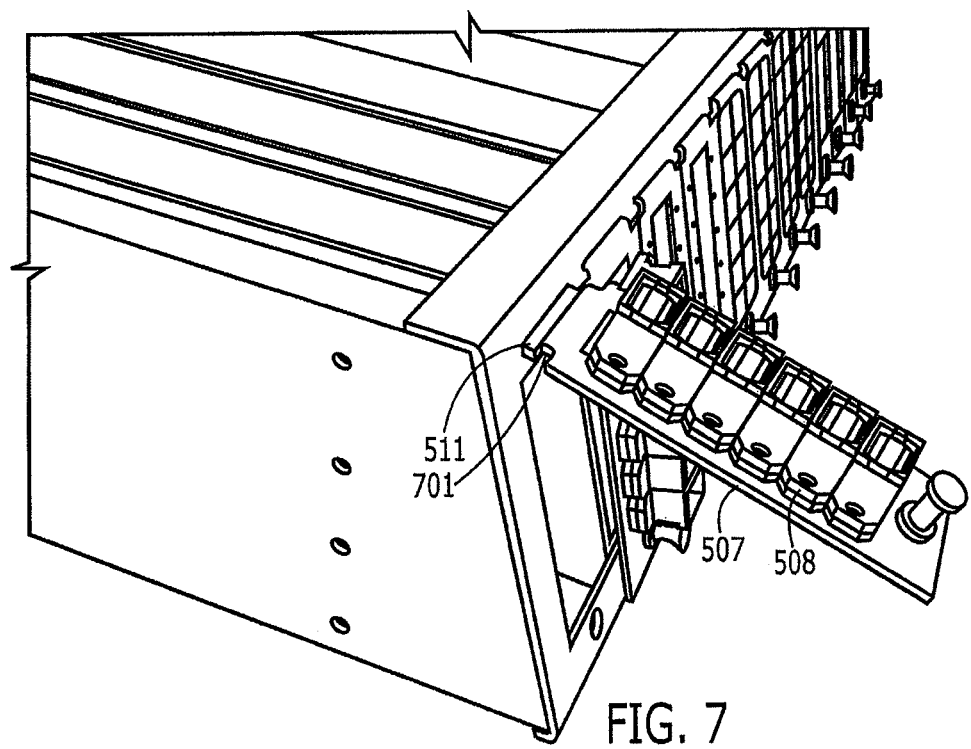
FIG. 7 shows a close up view of a door of the aggregator of FIG. 6 hinged upward.

Another aspect of the present invention is organizing the cables to minimize clutter. To this end, the present invention of one embodiment provides for an aggregator 501 as shown in FIGS. 5-7. The aggregator 501 functions to interface between a hydra and breakout box. The aggregator comprises at least a bottom wall 502, two side walls 503, a back 504 (which may or may not have a wall), and at least one faceplate 506. The aggregator comprises a plurality of bays 512. Each bay is configured to align with a card in the rack system. Adaptors 508 are arranged in at least one column along the faceplate 506. In one embodiment, there are multiple faceplates, each corresponding to an individual bay. In such an embodiment, a front wall 514 may be used. The front wall 514 defines a number of openings 515, each opening corresponding to a bay 512. In this embodiment, each faceplate 506 is disposed over an opening.

With respect to the rack system, often the chassis 101 will not be fully populated with cards 102, leaving a number of slots open in the chassis (see FIG. 1). In such a case, the bays in the aggregator corresponding to the empty chassis slots may not have faceplates with adaptors, but rather blanks 513. In one embodiment, the blanks 513 comprises labels 510 or vents to facilitate air movement.

Although an embodiment with a faceplate corresponding to each bay is show in FIGS. 5-7, it should be understood that other embodiments are possible. For example, a single faceplate may be used for all the bays. In such an embodiment, it may be beneficial to have knockout blanks for adaptors in the faceplate to allow a user to populate the faceplate with the desired configuration of adaptors.

The adaptors of each column include two or more secure adaptors. Again, secure adaptors are well known in the art. The adaptors shown are secure MPO adaptors although it should be understood that any multi-conductor connector adaptor could be used in the aggregator including for example MPX connectors. The use of secure adaptors 508 ensures that the correct hydra having a corresponding secure connector is inserted in the right position in the aggregator 501. To ease installation, in one embodiment, the faceplate 506 comprises a door 507 for each bay, wherein each column of adaptors is secured to the door. In one embodiment, the doors have a hinge 511 to facilitate their upward swing as shown in FIG. 7. Furthermore, in one embodiment, the doors are configured with a scallop 701 to allow them to be removed from the aggregator for easy access to the rear of the adaptors 508. The hinge may also be configured such that the door can be pushed into the interior of the aggregator slightly such that the door 507 is held in the upward position to facilitate connections to the rear of the adaptors 508. Such a configuration also facilitates cleaning of the trays, connectivity, and installing, changing and reading labeling In one embodiment, the faceplate 506 is tilted such that it faces upward relative to the bottom wall of the aggregator. This serves multiple functions. First, it creates a larger surface area on the faceplate to accommodate a longer column of adaptors. In other words, because the faceplate is tilted at an angle with respect to the bottom, the distance from the top of the faceplate to the bottom wall increases, thereby increasing the available space for adaptors. For example, in the embodiment shown in FIG. 7, the tilted faceplate 506 affords enough space for six MPO adaptors to be connected. Additionally, because the aggregator is adapted to be installed above, below, or to the side of the card chassis, tilting of the faceplate 506 toward the card chassis facilitates the connection to the hydra by reducing the likelihood that the minimum bend radius of the fiber will be exceeded. In other words, this configuration reduces the angle the fiber needs to bend between the aggregator port and the switch port so the chance of exceeding the minimum bend radius of the fiber is reduced, while also reducing the forward protrusion of the cables. Reducing the forward protrusion is important because often there is limited space between the rack rails and the door of the rack.

It should be understood that the upward tilt of the faceplate relative to the bottom wall of the aggregator does not mean the faceplate must necessarily be facing upward in the rack. The top/bottom and side-by-side references in this description are relative to the discrete component being described and are not absolute orientations. For example, the aggregator can be mounted in any configuration in the rack such that its bottom wall is facing up, down or sideways. Thus, the tilt of the faceplate relative to the cards changes as the aggregator is moved in relation to rack, even though the relative angle of the faceplate to the bottom wall of the aggregator remains the same. For example, if the faceplate is tilted upward relative to the bottom of the aggregator and the aggregator is mounted upside down and above the chassis, then the faceplate would be tilted downward and chasing the chassis. Likewise, if the aggregator is mounted to the side of the chassis with the bottom wall facing outward, the faceplate will be tilted sideways relative to the rack and facing the chassis.

Figure 12:
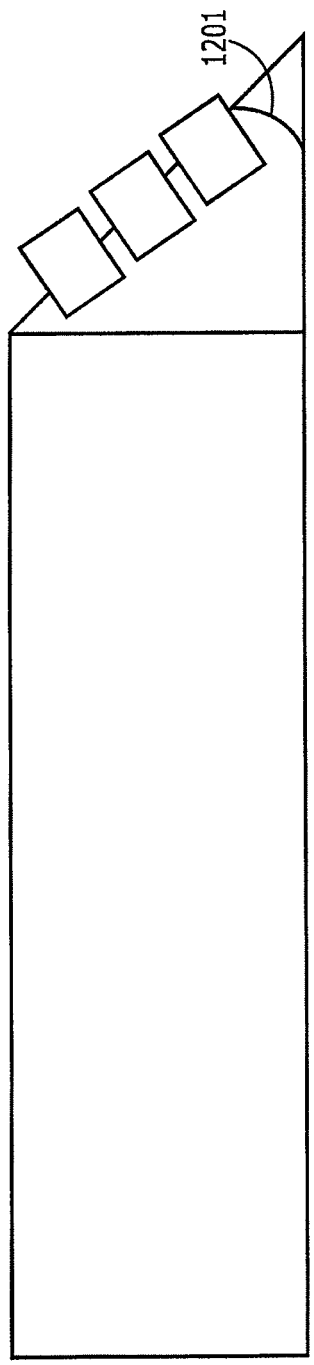
FIG. 12 shows a barrier in along the faceplate of the aggregator of FIG. 5.

Another cable control feature is shown in FIG. 12. In this embodiment, a barrier 1201 (FIG. 12) is disposed in the bottom front corner of the aggregator to ensure a cable does not snag or otherwise exceed its minimum bend radius. Additionally, a bracket 602 (FIG. 6) on the backside of the aggregator could be used to secure strain relief for the trunk cables exiting the aggregator.

Figure 8:
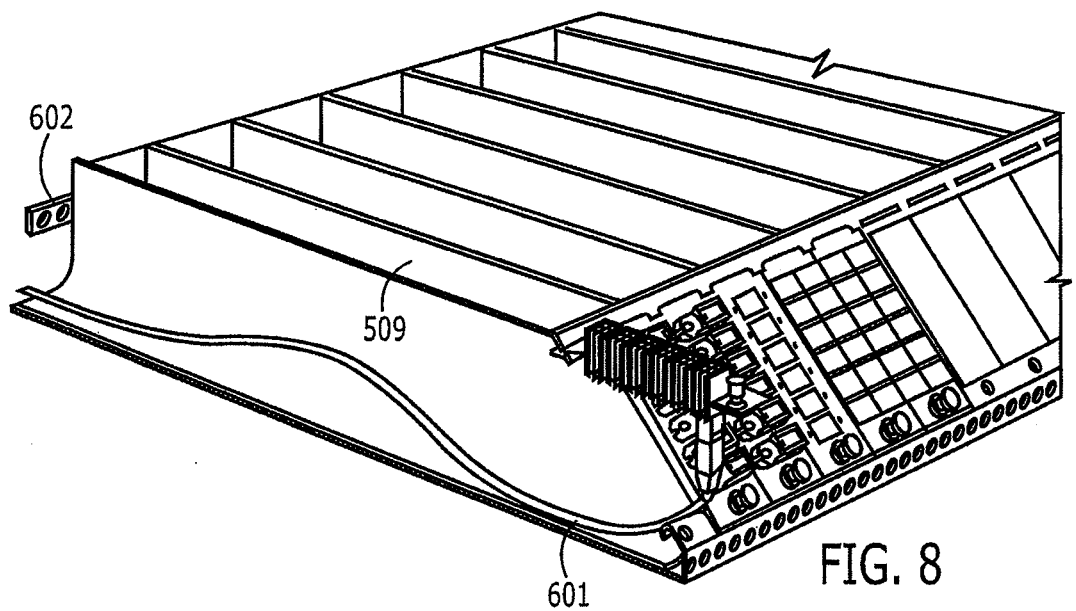
FIG. 8 shows a schematic cut away of the aggregator of FIG. 6 with a trunk cable attached to the backside of one of the secure adaptors.

Referring back to FIG. 5, in one embodiment, dividers 509 are used to segregate the interior space of the aggregator such that each channel corresponds to a bay 512. Such dividers also facilitate the installation of conductors as the cable can be threaded through the back 504 of the aggregator and will necessarily reach the front door opening on the front face 506 of the correct column of adaptors (see FIGS. 6 and 8). In other words, there is no opportunity for the cable that is being pushed through the channel to wander off into a different bay. Furthermore, because the trunk cable is contained in a channel, the dividers also allow the storage of an amount of slack to facilitate lifting the adaptor plate and providing some flexibility for moves, adds and changes (MACs). The dividers will prevent the slack form spilling over into adjacent bays and becoming entangled with adjacent trunk cables.

Figure 9:
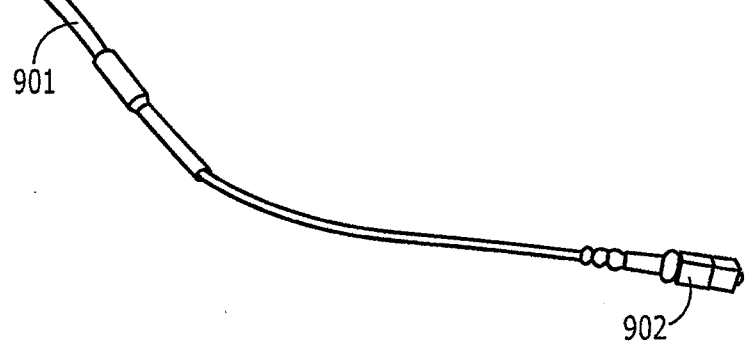
FIG. 9 shows an example of a trunk cable.

A trunk cable 901 is shown in FIG. 9. It comprises a connector 902 which is adapted to connect to the rear side of the adaptor 508 of the aggregator 501 and a connector 903 adapted to connect to a breakout box (shown in FIG. 10). Again, to ensure proper connectivity between the breakout box and its corresponding hydra, the cable trunk may comprise a secure connector on one or both ends (902, 903). To that end, the adaptor shown in FIG. 7 may be secure on both sides. (Note that FIG. 8 does not show secure adaptors for simplicity.) Additionally, the port arrangement on the breakout box can approximate that on the card.

Figure 10:
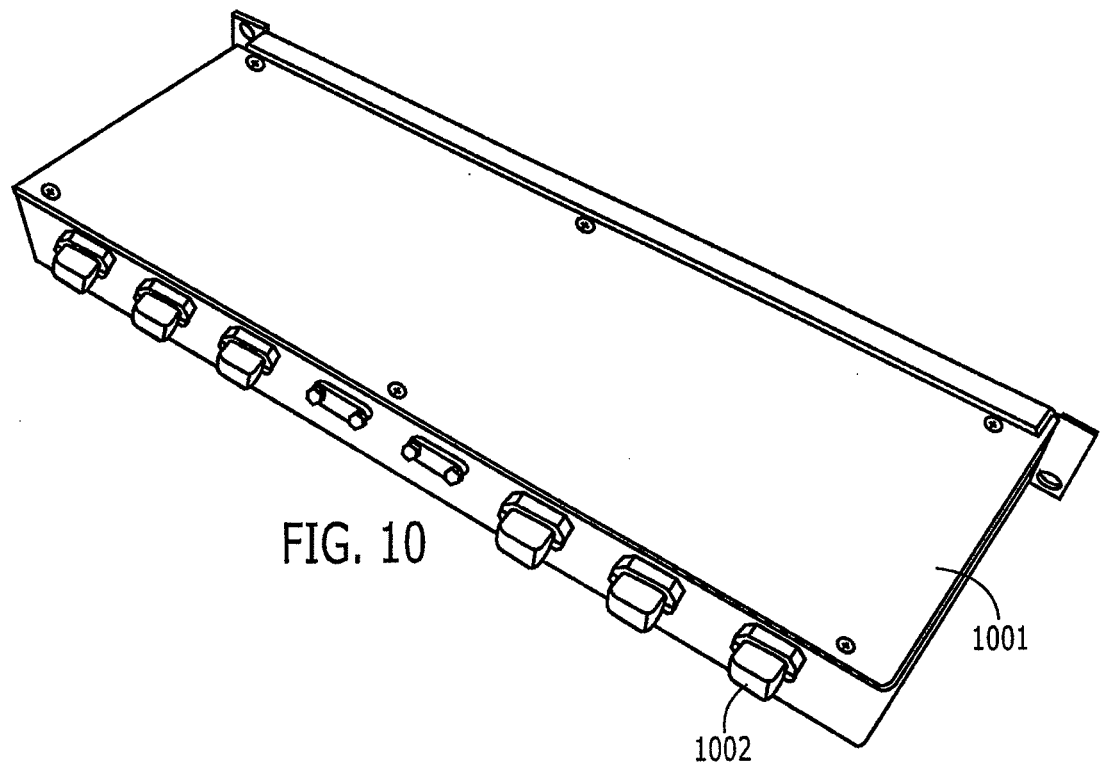
FIG. 10 shows a prospective view of a breakout box.
Figure 11:
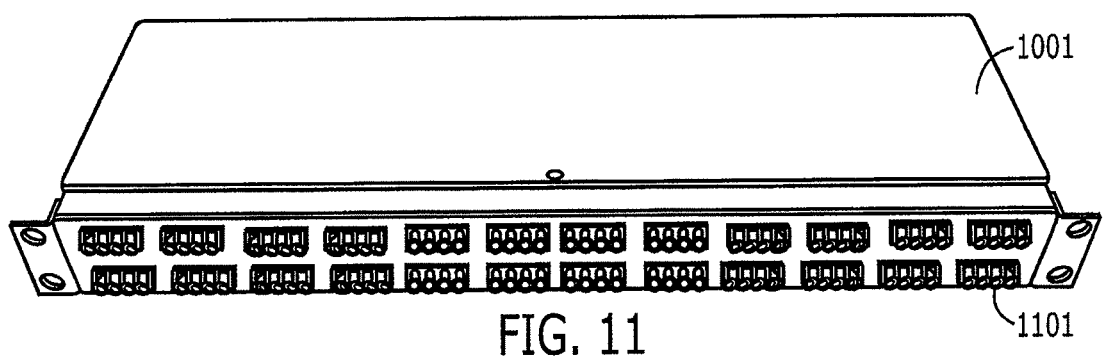
FIG. 11 shows the opposite side of the breakout box of FIG. 10.

Referring to FIG. 10, a breakout box 1001 is shown. Breakout box 1001 comprises multi-conductor connectors 1002, which are configured to interconnect with the connector 903 of the trunk cable 901 (FIG. 9). Again, if secure connectors are being used on the trunk cable 901, then the connector adaptor 1002 would also be a secure connector to interconnect with the secure connector 903. On the other side of the breakout box 1001 are individual channels 1001 as shown in FIG. 11. Such a breakout box is known. However, it may be worthwhile to use secure connectors for these breakout channels to ensure proper connectivity.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A switch rack system, said switch rack system comprising:
   a chassis including:
      a first port card mounted in the chassis;
   an aggregator positioned adjacent the chassis, the aggregator having a housing with a first side and an opposite, second side, the housing including: a bottom wall; a first side wall positioned at the first side of the housing; a second side wall spaced from the first side wall in a direction toward the second side of the housing; a back end; and, a front end, that together define a housing interior, the housing including:
      a faceplate positioned at the front end of the housing; the faceplate having a first end adjacent the bottom wall of the housing and an opposite remote second end; the faceplate having a tilt angle with respect to the bottom wall of the housing such that a distance of the faceplate between the first and second ends of the faceplate is greater than a shortest distance between the second end of the faceplate and a plane of the bottom wall of the housing;
      a first aperture arrangement in the faceplate; the second side wall extending from the faceplate toward the back end of the housing; the second side wall defining a first bay in the housing interior; the first aperture arrangement being aligned in a column with the first bay; the first bay corresponding to the first port card in the chassis; and
      a first removable cover positioned at the faceplate and closing the first aperture arrangement corresponding to the first bay.

2. The switch rack system of claim 1, wherein first and second adapters are positioned on the first removable cover; the first adapter having a first keying mechanism such that the first adapter will mate with a first connector having a corresponding keying element.

3. The switch rack system of claim 2, wherein the second adapter has a second keying mechanism different from the first keying mechanism such that the second adapter will mate with a second connector having a corresponding keying element and will not mate with the first connector; the first adapter being such that it will not mate with the second connector.

4. The switch rack system of claim 1, further comprising first and second hydras, the first hydra including: a first hydra first connector; a first plurality of second connectors; and, a first plurality of conductors; the first plurality of conductors connecting the first hydra first connector to the first plurality of second connectors, the first plurality of conductors being bundled together to form a first trunk portion from the first hydra first connector to a first breakout point; the second hydra including: a second hydra first connector; a second plurality of second connectors; and, a second plurality of conductors; the second plurality of conductors connecting the second hydra first connector to the second plurality of second connectors, the second plurality of conductors being bundled together to form a second trunk portion from the second hydra first connector to a second breakout point; wherein a length of the first trunk portion of the first hydra is longer than a length of the second trunk portion of the second hydra.

5. The switch rack system of claim 4, wherein the first and second connectors are fiber optic connectors.

6. The switch rack system of claim 4, wherein at least first and second aggregator ports are positioned on the first removable cover of the first bay.

7. The switch rack system of claim 6, wherein the first and second aggregator ports are aligned in a column.

8. The switch rack system of claim 7, wherein the first port card has a plurality of switch ports positioned in one column thereon; the first and second aggregator ports of the first removable cover being aligned vertically in a column with the plurality of switch ports of the first port card.

9. The switch rack system of claim 8, wherein the first hydra first connector is connected to the first aggregator port; and, the first plurality of second connectors of the first hydra is connected to a first set of the plurality of switch ports of the first port card; and, the second hydra first connector is connected to the second aggregator port; and, the second plurality of second connectors of the second hydra is connected to a second set of the plurality of switch ports of the first port card; the first set of the plurality of switch ports being further away from the aggregator then the second set of the plurality of switch ports.

10. The switch rack system of claim 1, wherein the switch rack system includes: a second port card mounted in the chassis adjacent to the first port card; a second aperture arrangement in the faceplate spaced from the first aperture arrangement in a direction toward the second side of the housing; and, a third side wall extending from the faceplate toward the back end of the housing dividing the housing interior into a second bay; the second aperture arrangement being aligned with the second bay.

* * * * *